INVENTOR.
RODERICK T. MACFARLANE

BY B.E.Shlesinger

ATTORNEY

INVENTOR.
RODERICK T. MACFARLANE

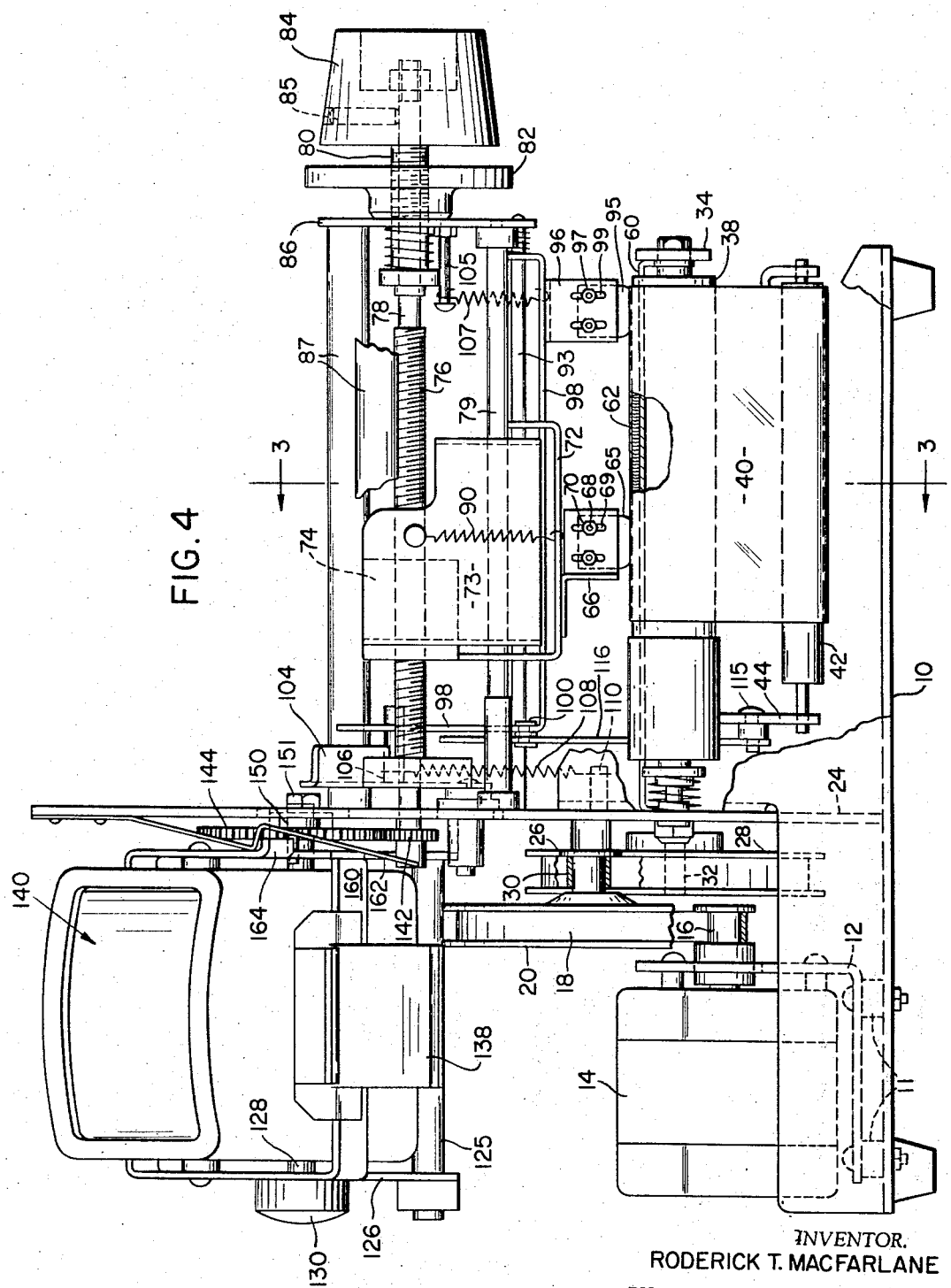

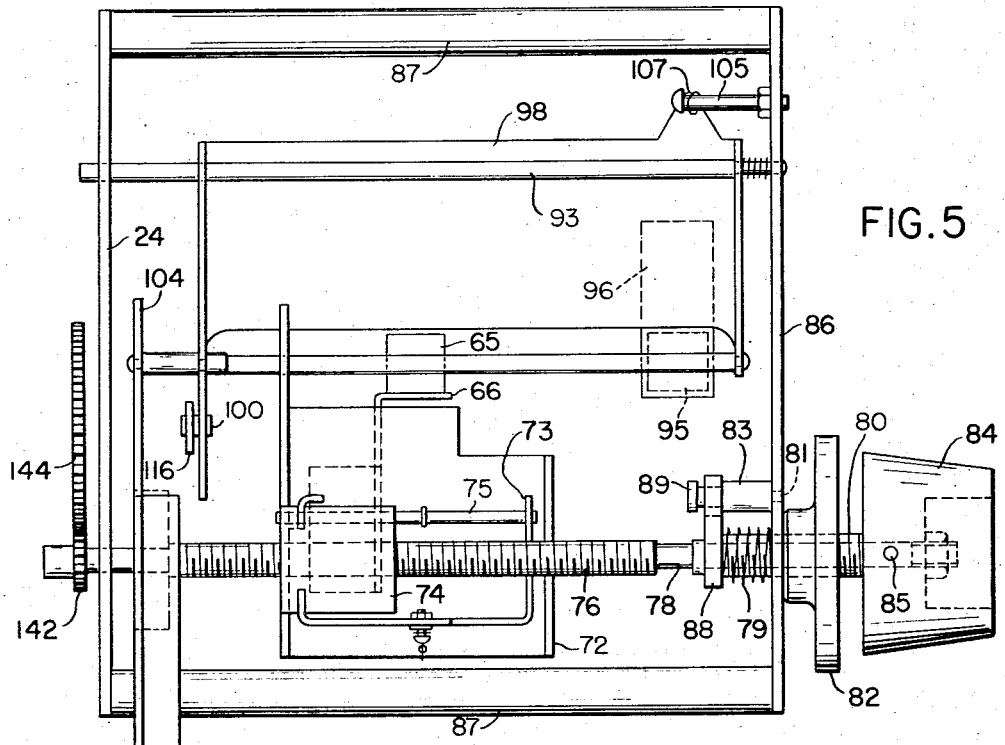
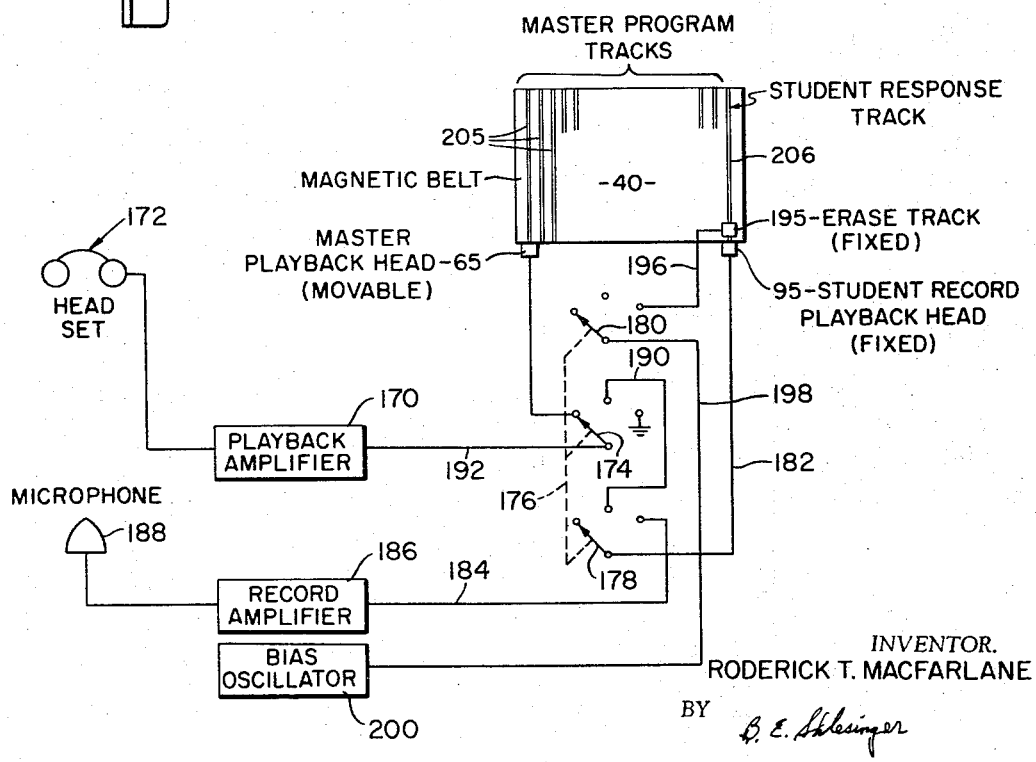

3,365,817
TEACHING MACHINE
Roderick T. MacFarlane, Pittsford, N.Y., assignor to Graflex, Inc., Rochester, N.Y., a corporation of New York
Filed Oct. 5, 1965, Ser. No. 493,192
4 Claims. (Cl. 35—35)

ABSTRACT OF THE DISCLOSURE

A belt is used on this machine on which separate instructional sound tracks have been recorded. The belt is driven under a play-back head for audible reproduction from each track. The student views through an aperture a frame on a film strip illustrating the subject matter of a sound track. The play-back head is shifted widthwise of the belt to bring the different sound tracks into registry with the play-back head; and simultaneously the film strip is indexed to bring successive frames into registry with the viewing aperture. A fixed combination play-back and recording head enables the student to dictate and to listen to his dictation.

---

The present invention relates to teaching machines, and particularly to machines for use in language training both in primary and secondary schools.

Many teaching aids have been developed in recent years to facilitate the teaching of languages. In most instances, this has meant the construction of so-called "language laboratories." A classroom has been equipped with permanent sound booths with individual tape recorders in each booth, and with a master control console for the teacher from which the teacher can monitor the individual training stations.

Installations of this nature are naturally quite costly, and also effectively tie up classroom space which is at a premium in these days of exploding population. The cost of such installations runs from a minimum of $500.00 per station up to $1500.00 or more per station. One of the chief causes for the high cost of language laboratory equipment has been that a full tape recorder concept is applied.

One object of this invention is to provide a language teaching machine that will be relatively inexpensive, and which will not require any special installation, such as is at present characteristic of a so-called "language laboratory."

Another object of the invention is to provide a relatively simple, inexpensive teaching machine based upon an audio-visual concept.

Still another object of the invention is to provide a teaching machine employing an audio medium such as a magnetic belt having space for a plurality of units of language instruction and also a track for student response, coupled with a simple film strip viewer, so as to provide an instrument which will afford a combined program of audio-visual language training in a unit whose size does not exceed that of standard office desk-type dictating machines, or optionally as an audio unit only.

Other objects of the invention will be apparent hereinafter from the specification and from the recital of the appended claims.

In the drawings:

FIG. 4 is a front elevation of the machine, with parts broken away;

FIG. 5 is a sectional view of the machine in a horizontal plane;

FIG. 7 is an electric wiring diagram, showing one way in which the machine may be wired to accomplish its purpose.

In the machine ilustrated, there is a recording and/or play-back head for listening to lessons recorded on an endless magnetic belt or tape; and there is a viewing aperture for viewing frames containing illustrations related to the lesson material. The tapes used are wide tapes and can record a plurality of lessons disposed in spaced, parallel strips each extending around the tape. There is also space provided on the tape on which the student can record to compare, if the lessons are in language, for instance, his own diction and pronunciation with those of the teacher. For this puropse a second recording and play-back head is provided so that the student can record, and then listen to his recording. If desired an erasing means may be provided to erase from the tape the student's previous recording ahead of his new recording. The first head, which is preferably only a play-back head is movable axially of the tape to index it from the lesson strip to lesson strip. The second head is preferably stationary. The tape is driven from a motor through a conventional roller drive to move the tape under the heads to achieve, in the instance of the first head, play-back of the lesson which is recorded on the tape in that strip of the tape which at the time registers with the first head, and to achieve, in the case of the second head, recording of the student's response on the strip of tape registering with the second head, or play-back of such a recording. The first head is indexed through manually-operable means step-by-step along the tape. This manually-operable indexing mechanism is geared to toothed rolls which move the strip film loop, frame by frame, past the viewing aperture. Thus as the first head is indexed to a new position along the tape, the film strip is also indexed to bring a new film frame into registry with the viewing aperture.

Figure 1:
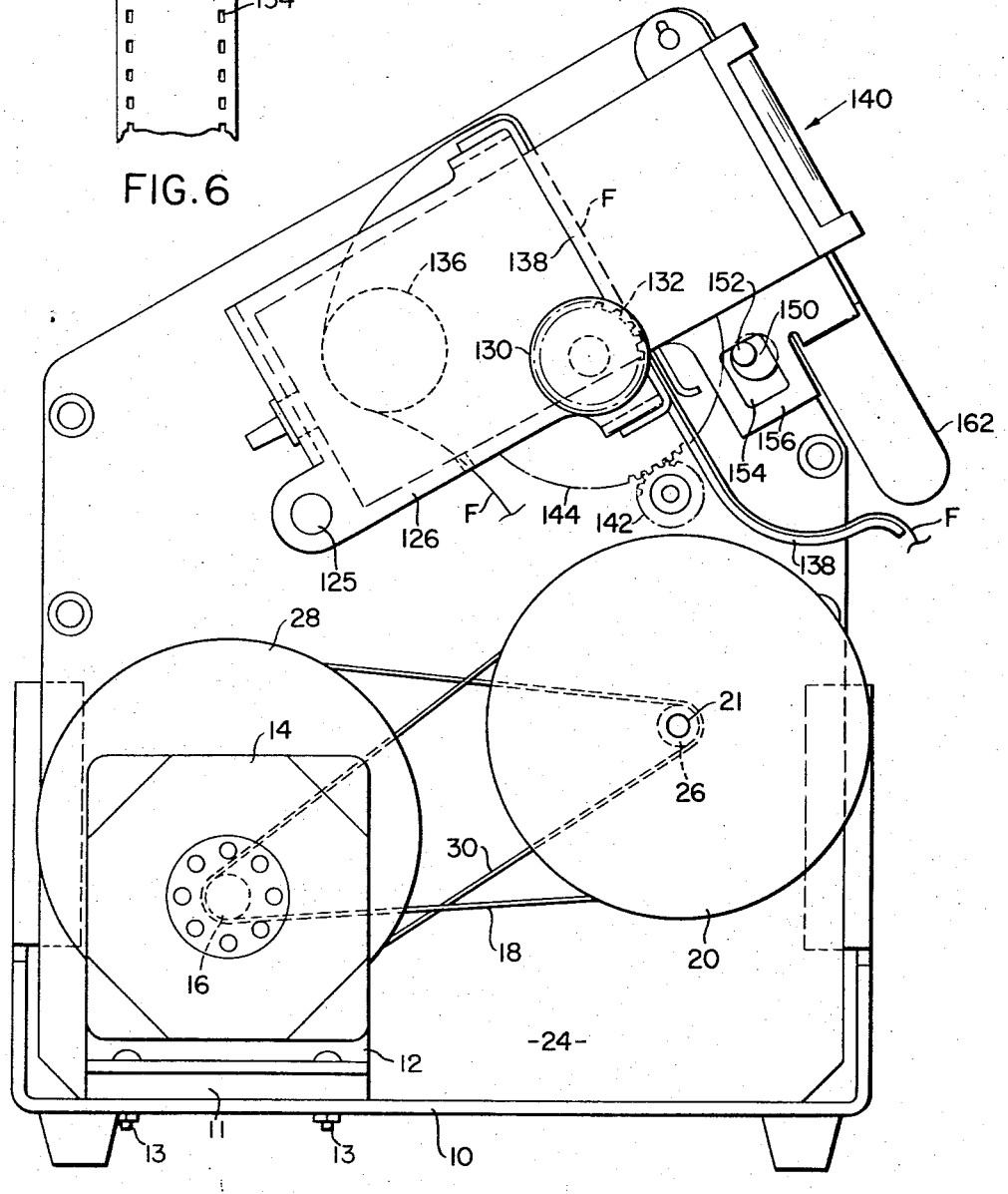
FIG. 1 is a side elevation, looking at one side of a teaching machine constructed according to one embodiment of this invention, the side guards or cover plates being removed.

Referring now to the drawings by numerals of reference, 10 denotes the base or frame of the machine. Mounted on this base 10 in conventional manner by means of resilient blocks 11 and securing bolts 13 (FIG. 1) is a right-angular bracket 12 on the upright portion of which is mounted a conventional electric drive motor 14. The armature shaft of this motor carries a drive pulley 16 which drives by means of a belt 18 (FIG. 1) a pulley 20. Pulley 20 is journaled on a stub shaft 21, which is mounted on a partition wall 24 that is rigidly fixed to base 10 intermediate the sides of the base. Integral with the pulley 20 is a pulley 26 which drives a pulley 28 through the medium of the belt 30.

Figure 2:
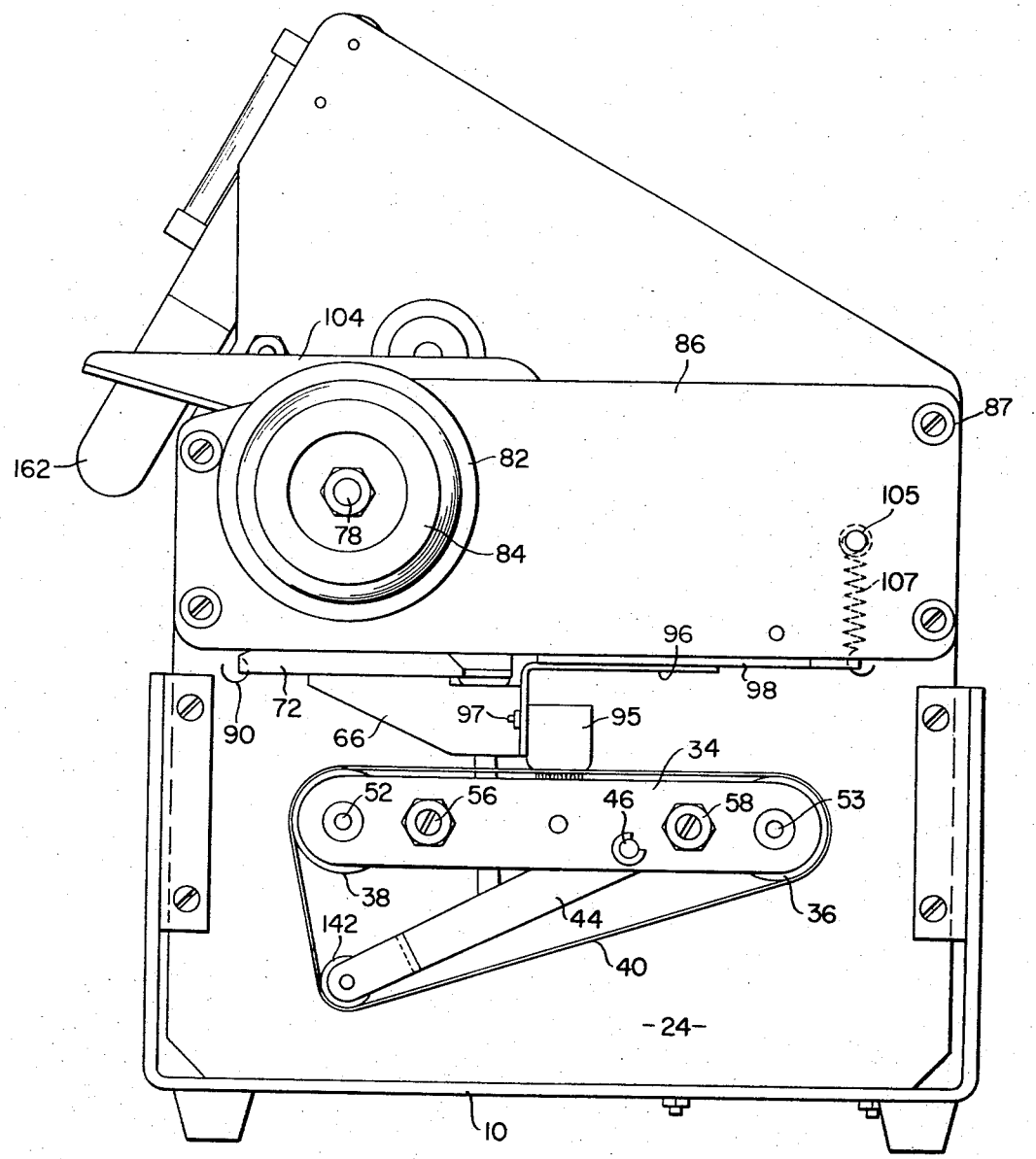
FIG. 2 is a side elevation looking at the other side of this machine, the guards or cover plates of this side also being removed.
Figure 3:
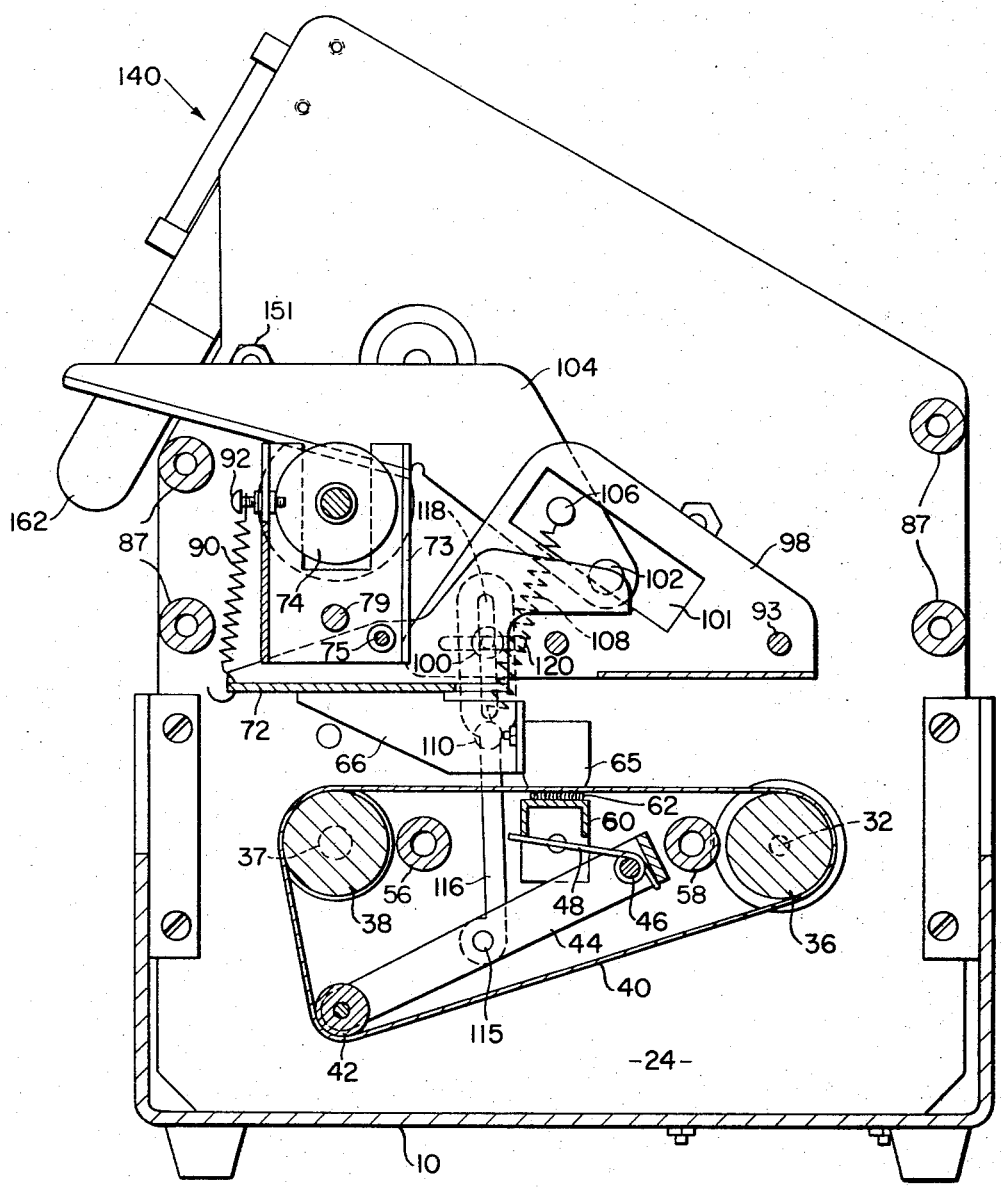
FIG. 3 is a vertical section through the machine in a plane parallel to the plane of FIG. 2.

The pulley 28 is fastened to a shaft 32 (FIG. 4) which is journaled in the partition 24 and in a parallel plate 34 (FIG. 2) adjacent the distal side of the machine. The shaft 32 carries a roller 36 (FIG. 3). Mounted at opposite ends in the plate 34 and the plate 24 in parallelism to shaft 32 is a shaft 37 on which is rotatably mounted a second, idler roller 38. The rollers 36 and 38 are adapted to support a wide belt 40, which may be similar to the wide magnetic tape belt employed on the well-known magnetic dictating machines. A belt-tightening roller 42 is journalled at opposite ends in a U-shaped lever 44 that is mounted to swing about a pivot shaft 46 that is secured at opposite ends in the plate 34 and in the plate 24. A coil spring 48, which wraps around the shaft 46 and engages at one end with the bight portion of the lever 44 and at its other end with the downturned portion of a channel-iron 60 (FIG. 3), serves to tension the lever and press the roller 42 constantly into engagement with the belt 40 to hold the same taut.

Parallel rods 56 and 58 support the plate 34 from the partition plate 24. Channel-iron 60 is U-shaped in cross-section and carries felting or other material 62 over which the belt 40 travels.

Mounted above the belt 40 is a conventional recording and play-back head 65 (FIG. 4), such as is used with dictating belts. This is adjustably mounted on a bracket 66 by screws 68 which pass through slots 69 in the bracket and are secured in position by nuts 70, that thread onto the screws. Slots 69 permit of adjustment of the recording head toward and from the belt 40.

The bracket 66 depends from yoke 72 (FIG. 3) on which there is pivotally mounted a carriage 73 (FIGS. 3 and 5) in which there is secured a nut 74. Nut 74 meshes with the screw portion 76 of a shaft 78 that is journalled at opposite ends in the plate 24 and in a sleeve 80 (FIGS. 4 and 5) on which there is threaded a stop nut 82. A knurled knob 84 is fastened to the outer end of the shaft 78 by a set-screw 85.

The frame 73 is mounted to slide on a rod 79 which is secured at opposite ends in a plate 86 (FIGS. 2 and 4) and plate 24, respectively. Bracket 86 is supported from partition plate 24 by parallel rods 87 (FIGS. 2 and 5). A coil spring 90, which is connected at one end to the yoke 72 and at its opposite end to a stud 92 (FIG. 3) that is fastened in the carriage 73, serves to urge the yoke 72 constantly in a clockwise direction as viewed in FIG. 3, about a stud 75, that is secured in carriage 73.

A second recording head 95 (FIG. 4) is secured to a bracket 96, which depends from a yoke 98, by screws 97, which pass through slots 99 in the bracket. The yoke 98 is pivoted adjacent its rear edge on a shaft 93 supported between plates 24 and 86, and has a triangular shaped portion at its left-hand end, as viewed in FIG. 4 (see FIG. 3). There is a rectangular slot 101 in this triangular portion in which engages a stud 106, that is carried by a toggle lever 104 intermediate its ends. Lever 104 is pivoted at 102 on the plate 24 of the machine. A coil spring 108 connects the stud 106 with a pin 110 that projects from plate 24, and is secured thereto.

Pivotally connected at 115 (FIG. 3) to the lever 44 intermediate the ends thereof is a link 116, which has a slot 118 in it adjacent its upper end that engages over the stud 100 that is mounted in a slot 120 in the yoke 98 to slide laterally therein.

The yoke 98 is resiliently supported from a stud 105 (FIG. 4) by a coil spring 107 which is connected at one end to the stud 105 and at its opposite end to the yoke. Stud 105 is supported from the plate 86.

The lever 104 projects forwardly through the casing of the machine and when pivoted upwardly manually rocks the lever 104 to cause the stud 106 to engage the upper side of the slot 101, thereby lifting the stud 100 in the slot 118. When the stud reaches the upper end of the slot 118, it lifts the link 116, thereby rocking the lever 44 about its pivot 46 to release the tension of the roller 42 on the belt 40. The belt 40 can then be slid easily on the rollers 36 and 38 to take it out of the machine, and replace it by another belt. A slot 120 in yoke 98, which extends transversely to slot 118 in link 116, permits free movement of stud 100 without binding.

Pivotally mounted in the upper left-hand portion of the machine, as viewed in FIG. 4, by means of a shaft 125 (FIG. 1) is a housing 126.

Figure 6:
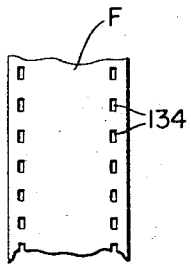
FIG. 6 is a fragmentary view of a film strip such as may be used in this machine.

A shaft 128, which is journaled in this housing and which is rotatable by means of a knob 130, has a pair of toothed wheels 132 secured to it. These are adapted to engage in the notches 134 (FIG. 6) formed adjacent the marginal edges of a removable conventional, endless film strip F that may be placed in the machine and that has a plurality of frames for illustrating, respectively, different objects, scenes, or the like. The film strip is adapted to be fed over a suitable roller 136 in the housing and over a guide plate 138 past a viewing opening 140 in the housing 126 and past suitable viewing lenses mounted between the opening 140 and the film.

Screw shaft 76 carries at its left-hand end, as viewed in FIG. 4, a pinion 142 (FIGS. 1 and 4), which meshes with a gear 144 that drives the shaft on which the toothed wheels 132 are mounted. Thus, upon rotation of the knob 84 (FIG. 4), not only is the recording head 65 traversed across the tape 40, but also the film F is indexed so as to bring new frames successively into registry with the viewing opening 140.

To effect indexing of the movable head 65 relative to the tape 40 and to effect indexing of the film strip F, the knob 84 is pushed inwardly against the resistance of a spring 79 to disengage the pin 81 (FIG. 5) from the plate 86. Pin 81 is the reduced diameter end of a roller 83 which is also reduced in diameter adjacent its other end and is mounted in a block 88 that slides on the non-threaded portion of the screw shaft 78. A knob 89 may be used for manually disengaging the pin 81, if desired.

Ordinarily a plurality of language instructions will be placed on the tape 40 so that on one complete revolution of the tape past the recording head 65, one particular lesson will be given, corresponding to what is illustrated in one frame of the film. Then the knob 84 will be rotated to index the head 65 to another place along the width of the tape 40, and to simultaneously bring into the viewing opening another frame of the film corresponding to the material on the new section of tape. Upon pressing the button or switch that controls motor 14, then, the tape will be revolved to give off a lesson audibly and the student can simultaneously view the frame, which is at the viewing opening, so that, for instance, he can see the article referred to, and how its name is spelled, and pronounced.

For practice, the student can dictate onto the tape 40 by means of a conventional microphone, which is coupled to the recording head 95, and listening, compare his pronunciation and spelling with the pronunciation and spelling of the lesson material on the tape.

The position of the housing 126 may be adjusted by rotation of a stub shaft 150 (FIGS. 1 and 4) which carries a pin 152 that engages in a slot 154 in an arm 156 that depends from the housing. This enables the viewing window 140 to be adjusted to accommodate the individual using the teaching machine. Shaft 150 may have a hexagonal head 151 by which it can be manipulated.

The housing 126 is held down on a supporting strap 160, (FIGS. 1 and 4) that supports it from the plate 24, by means of a spring latch 162 which is riveted to plate 24 and which is adapted to engage over a catch 164 that is fastened to the housing 126. By pressing on the lower end of the latch 162 it can be disengaged from the catch 164 to permit upward swing of the housing about its pivot 125.

One way in which the machine may be wired to accomplish its purpose is illustrated in FIG. 7.

The movable play-back head 65 may be connected through a play-back amplifier 170 of conventional construction to a conventional audio head set 172 so that the student may listen to the instruction lesson provided on the magnetic belt 40, when the switch blade 174 is in its No. 1 position shown in FIG. 7. Switch 174 is one blade of a three-bladed switch 176. When blade 174 is in this position the blades 178 and 180 of switch 176 are also in their No. 1 positions, which are their open positions.

When the student wants to practice his lesson, as, for instance, by repeating it on the student track 206 of the tape 40, he moves the switch 176 to its No. 3 position, thereby connecting the line 182 through the switch 178, line 184, and record amplifier 186 with the microphone 188 so that he can dictate to the tape. Simultaneously, he erases his own recording from the magnetic belt by the standard erasing head 195 which is carried by his recording head 95, this head 195 being at that time connected through line 196, blade 180 in its No. 3 position, and line 198 to a conventional bias oscillator 200 which produces the erasing bias. The erasing head travels ahead of the student record playback head so as to erase from the tape any material previously recorded by the student.

If the student wishes to listen to his dictation so as to be able to hear his pronunciation, and how he sounds, he moves the switch 176 to its No. 2 position. Then the play-back head 95 is connected through line 182, switch blade 178, line 190, switch blade 174, line 192, and amplifier 170 to his head set.

For use, a pre-recorded instruction belt 40 is inserted in the machine so that it will be driven over the rollers 36, 38 and 42. A continuous loop film strip F is also inserted in the viewing end of the machine with one of its frames registered with the viewing aperture 140.

The indexing head of the machine is then set for the first frame.

The student, using a combined head set-microphone, that is connected into the machine, will push the switch button (not shown) to start the motor 14. This will drive the roller 36 causing the first segment of the tape 40 to be reproduced audibly in the student's head set. The picture at the viewing opening 140 may be descriptive of the audio portion and show the actual spelling of words together with the phonetic spelling of the major element of the lesson. By operating a push button the student can repeat in his microphone 188 the audio he has heard, recording it on a track adjacent to the instruction track. The student is then able to hear either the instructor's voice or his own reproduction of the segment over and over. He can rerecord his own speech at will switching back and forth between his own recording and the instructor's recording as many times as he wishes by manipulation of the switch 176.

When the student is satisfied with his performance on the first segment of the tape, he moves the indexing head to the No. 2 position of the track, by rotating the knob 84, which simultaneously through pinion 142 and gear 144, repositions the film strip to its second frame. No complex electrical interconnection between the audio and visual advance systems is required. The student thus proceeds through the program at his own pace spending as much time on each segment of the tape as he chooses until he has perfected his reading and pronunciation.

The recording portion of the unit also provides for erasure of the student track ahead of the recording so that an instruction belt can be used over and over again. There can be eighty or more segments of instruction material with a single response track for the student; and the student can use his single response track repeatedly.

One advantage of the machine of this invention is that a teacher can record a program for use with the equipment. From prepared material the teacher can easily make a full magnetic tape program to match a film strip in a few minutes.

While the invention has been described in connection with a specific embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention or the limits of the appended claims.

Having thus described my invention, what I claim is:

1. A teaching machine comprising a housing having a viewing aperture therein,
    first means for movably supporting an endless belt on which instructional material may be recorded in separate strips arranged discretely widthwise of the belt and each extending in the direction of travel of the belt,
    second means for movably supporting a medium, on which related illustrative material has been recorded, in position to be viewed through said aperture,
    a play-back head disposed to register with said belt,
    means for effecting movement of said first supporting means to effect movement of said belt longitudinally under said play-back head to effect audio reproduction of material recorded on said belt,
    means for shifting said play-back head transversely of said belt to bring separate strips of the instructional material selectively into registry with said play-back head to achieve audio reproduction of said separate strips,
    means connected to said shifting means for simultaneously with said shifting movement indexing said second supporting means to bring a different portion of said medium into registry with said viewing aperture,
    a combination recording and play-back head mounted in fixed position to register with said belt to record a student's dictation on said belt or to reproduce this dictation, and
    means for selectively rendering said combination head operative to record or to reproduce.

2. A teaching machine as claimed in claim 1, wherein erasing means is mounted fixedly adjacent said combination head and in advance thereof in the direction of longitudinal movement of said belt to erase from said belt previously recorded dictation.

3. A teaching machine as claimed in claim 1, wherein said second supporting means comprises rotary means for supporting a photographic film strip, and said indexing means is operative to index the film strip a frame each time said play-back head is shifted transversely of said belt.

4. A teaching machine comprising
    (a) a housing having a viewing aperture therein,
    (b) a pair of parallel, rotary rollers for supporting an endless belt on which instructional material has been recorded in separate strips, each extending around the belt,
    (c) a carriage movable in said housing axially of said rollers,
    (d) a play-back head mounted on said carriage and movable, upon movement of said carriage, into registry with different strips of the belt,
    (e) means, including a motor, for driving one of said rollers to move said belt past said head to cause said head to reproduce audibly the material recorded on a strip of said belt,
    (f) means, including a roller for supporting a photographic film strip and moving it past said viewing aperture to bring successive frames of the film strip successively into registry with said aperture,
    (g) means, including a rotary screw shaft and a nut into which said shaft threads, for moving said carriage,
    (h) gearing connecting said screw shaft with the last-named roller to advance the film strip upon movement of said carriage, (i) manually operable means for rotating said screw shaft, (j) a combined recording and play-back head mounted in fixed position in said housing to record dictation on a portion of said belt or to reproduce audibly dictation previously recorded thereon, (k) means for selectively rendering the first and second named heads operative, and (l) means for rendering said second-named head operative selectively to record and to reproduce.

References Cited

UNITED STATES PATENTS

| | | | |
|---|---|---|---|
| 2,650,097 | 8/1953 | Erdos | 35—35.3 X |
| 2,876,561 | 3/1959 | Horne | 35—35.3 |
| 3,142,909 | 8/1964 | Irazogui | 35—35.3 |
| 3,266,172 | 8/1966 | Heinberg | 35—35.3 X |

EUGENE R. CAPOZIO, *Primary Examiner.*

W. GRIEB, *Examiner.*